(12) United States Patent
Martinez Andrade et al.

(10) Patent No.: US 10,216,747 B2
(45) Date of Patent: Feb. 26, 2019

(54) CUSTOMIZED SYNTHETIC DATA CREATION

(71) Applicant: Microsoft Technology Licensing, LLC, Redmond, WA (US)

(72) Inventors: Andres Martinez Andrade, Renton, WA (US); Ganapathi S. Sadasivam, Snohomish, WA (US); Sri Srinivasan, Redmond, WA (US); Sreenivas N. Simhadri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 594 days.

(21) Appl. No.: 14/676,051

(22) Filed: Apr. 1, 2015

(65) Prior Publication Data

US 2016/0162499 A1    Jun. 9, 2016

Related U.S. Application Data

(60) Provisional application No. 62/087,920, filed on Dec. 5, 2014.

(51) Int. Cl.
 *G06F 17/30* (2006.01)
(52) U.S. Cl.
 CPC .. *G06F 17/30088* (2013.01); *G06F 17/30289* (2013.01); *G06F 17/30312* (2013.01); *G06F 17/30595* (2013.01)
(58) Field of Classification Search
 CPC ......... G06F 17/30289; G06F 17/30306; G06F 17/30867; G06F 17/30309; G06F 17/30604; G06F 17/30088; G06F 17/30312; G06F 17/30595
 See application file for complete search history.

(56) References Cited

U.S. PATENT DOCUMENTS

| 7,240,054 | B2 | 7/2007 | Adiba et al. |
| 7,933,932 | B2 | 4/2011 | Singh |
| 7,979,410 | B2 | 7/2011 | Pattabhi et al. |
| 8,352,425 | B2 | 1/2013 | Bourbonnais et al. |
| 8,751,460 | B1 | 6/2014 | Annapragada et al. |
| 2005/0010564 | A1* | 1/2005 | Metzger ............ G06F 17/30339 |
| 2005/0289013 | A1* | 12/2005 | Goldberg ......... G06Q 10/06311 |
| | | | 705/7.13 |
| 2007/0239649 | A1 | 10/2007 | Bloesch |

(Continued)

OTHER PUBLICATIONS

Rabl, et al., "Parallel data generation for performance analysis of large, complex RDBMS", In Proceedings of the Fourth International Workshop on Testing Database Systems, Jun. 13, 2011, 6 pages.

(Continued)

*Primary Examiner* — Tarek Chbouki
(74) *Attorney, Agent, or Firm* — Christopher R. Christenson; Kelly, Holt & Christenson PLLC

(57) ABSTRACT

A system and method are provided that facilitate generation of a large volume of customized synthetic data for testing operations using a parallel synthetic data creation technique while ensuring relational integrity of the generated data. In some examples, values for primary keys and foreign keys as well as relationships in the metadata are created in a way that allows a user to easily change the value or range of values for any suitable field.

18 Claims, 9 Drawing Sheets

(56) References Cited

U.S. PATENT DOCUMENTS

| | | | | |
|---|---|---|---|---|
| 2008/0065452 | A1* | 3/2008 | Naeymi-Rad | G06Q 50/22 705/1.1 |
| 2008/0220873 | A1* | 9/2008 | Lee | A63F 13/352 463/42 |
| 2008/0256111 | A1 | 10/2008 | Haham et al. | |
| 2009/0006314 | A1* | 1/2009 | Balmin | G06F 17/30929 |
| 2010/0192220 | A1 | 7/2010 | Heizmann et al. | |
| 2011/0167402 | A1* | 7/2011 | Ahmad | G06F 17/30604 717/101 |
| 2011/0295836 | A1* | 12/2011 | Bolsius | G06Q 10/10 707/714 |
| 2012/0030258 | A1* | 2/2012 | Jain | G06F 17/30309 707/812 |
| 2012/0072470 | A1* | 3/2012 | Joseph | G06F 17/3048 707/812 |
| 2012/0330880 | A1 | 12/2012 | Arasu et al. | |
| 2014/0115007 | A1* | 4/2014 | Harvey | G06F 17/30289 707/796 |
| 2014/0207801 | A1* | 7/2014 | Palmert | G06F 17/30867 707/749 |
| 2015/0135261 | A1* | 5/2015 | Park | H04L 63/102 726/1 |
| 2015/0178366 | A1* | 6/2015 | Farahbod | G06F 17/30306 707/603 |

OTHER PUBLICATIONS

Frank, et al., "Efficient Update Data Generation for DBMS Benchmarks" In Proceedings of the 3rd ACM/SPEC International Conference on Performance Engineering, Apr. 22, 2012, pp. 169-180.

Hoag, et al., A parallel General-Purpose Synthetic Data Generator, In Newsletter ACM SIGMOD, vol. 36, Issue 1, Mar. 2007, pp. 19-24.

Rabl et al., "Rapid Development of Data Generators Using Meta Generators in PDGF", In Proceedings of he Sixth International Workshop on Testing Database Systems, Jun. 24, 2013, 6 pages.

International Search Report and Written Opinion for International Patent Application No. PCT/US2015/064157, dated Mar. 17, 2016, date of filing: Dec. 7, 2015, 14 pages.

Chays et al., "An AGENDA for testing relational database applications", Software Testing, Verification and Reliability, Mar. 2004, 28 pages. Retrieved from the Internet: <<URL:http://onlinelibrary.wiley.com/store/10.1002/stvr.286/asset/286_ftp.pdf?v=1&t=ildoe761&s=213839dc420e676a8f79a1010fef3cd6bb1flbc5e>>, retrieved on Mar. 3, 2016.

International Preliminary Report on Patentability for PCT/US2015/064157 dated Mar. 13, 2017, 8 pages.

* cited by examiner

CUSTOMIZED SYNTHETIC DATA CREATION

CROSS-REFERENCE TO RELATED APPLICATION

The present application is based on and claims the benefit of U.S. provisional patent application Ser. No. 62/087,920, filed Dec. 5, 2014, the content of which is hereby incorporated by reference in its entirety.

BACKGROUND

Computer systems are currently in wide use. Some computer systems are relatively large and may include, for instance, thousands of different forms (e.g. electronic fillable documents) and other types of elements. Such computer systems are often customized (some heavily so) before they are deployed in a given implementation. Some large computer systems may include many thousands of different forms, each of which may have different controls and other user interface elements. Some example systems also include execution logic as well as workflows that allow end users to access the system and perform a set of activities, or tasks, in order to carry out their duties in conducting a particular operation.

When such a computer system is deployed in a specific environment, it is common for the system to be customized to meet the functional requirements of the particular end user. By way of example, different customers may wish to have different form controls on a given form that represents a particular entity. In addition, different customers may also wish to have different fields, execution logic, or other items on a particular report form. Thus, it can be seen that a given computer system may be highly customized so that it meets the requirements of a particular end user for which the system is implemented.

When the base system is authored (before it is customized) it may also include a number of different tests that can be run to determine whether the system is working properly. Additionally, as a developer customizes or continues to develop on the base system, the developer may generate additional tests as well. Further, once the development is complete, it is also important to ensure that a system is functioning properly so that it will effectively handle real data.

In some cases, synthetic data is used to test the system. Generating a large volume of synthetic data for such a system is a complex and long-running process that usually involves many different entities and complex logic. It can be difficult to generate the synthetic data rapidly without introducing any errors. It is also difficult to maintain the relational integrity if the data generation is done in parallel.

The discussion above is merely provided for general background information and is not intended to be used as an aid in determining the scope of the claimed subject matter.

SUMMARY

A computing system for generating synthetic data in a relational database management system is provided. The computing system includes a processor configured to execute a plurality of programmatic threads and a relational database structure component having information indicative of a structure of the relational database management system. The processor is configured to receive values information relative to the synthetic data and to execute, substantially simultaneously, a plurality of synthetic data generation threads using the information indicative of the structure of the relational database management system and the values information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Testing a complex computer system has always been an important operation. In order to have accurate testing and observe how the system will behave with large amounts of real data, it is important to populate the system with a similar amount of synthetic data. Then, system response times as well as the responses themselves can be tested or measured to ensure that the system will function properly with "real" data. Embodiments described below generally provide the ability to generate a large volume of customized synthetic data for testing operations by using a parallel creation technique while maintaining the relational integrity of the generated data at the same time. In some embodiments, values for primary keys and foreign keys as well as relationships in the metadata are created in a way that allows a user to easily change the value or range of values for any suitable field.

Figure 1:
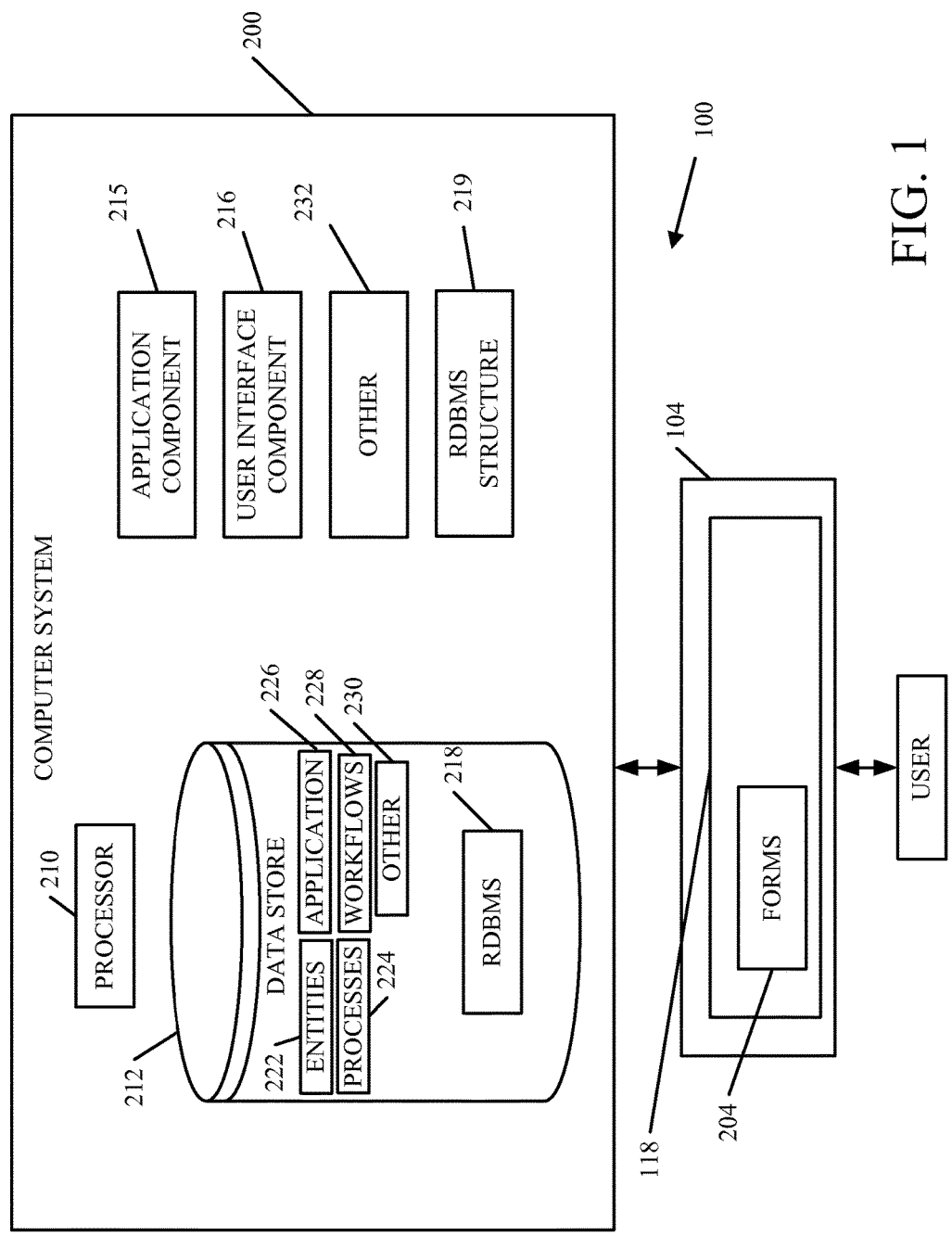
FIG. 1 is a diagrammatic view of a computer system in accordance with an embodiment.

FIG. 1 is a block diagram of a computer system environment 100 in accordance with an embodiment. Computer system 200 may be any suitable computer system that is generally provided as a base system and subsequently customized or otherwise developed prior to deployment. System 200 is shown generating user interface displays 118 that can include forms 204. System 200 may have thousands of different forms 204, each of which may have many controls. The user interacts with user interface displays 118 in order to interact with, and manipulate, system 200.

System 200, in one example, includes processor(s) 210, data store 212, application component 215, and user interface component 216. System 200 can also include other components 232 as well. Processor(s) 210 includes a plurality of cores or is otherwise able to execute a plurality of programmatic threads substantially simultaneously.

Data store 212, in one embodiment, includes data entities 222, processes 224, applications 226, workflows 228 and other data records 230. Entities component 222, in one embodiment, describes entities within or otherwise used by system 200. Data store 212 may also include one or more relational databases 218. However, embodiments can be practiced where the one or more databases are located remotely from system 200 and communicatively coupled to system 200 through any suitable communication media.

Applications 226 can be any suitable applications that may be executed by system 200 in order to perform one or more functions for which system 200 is deployed. Application component 215, in one example, runs applications 226, which can include processes 224 and workflows 228. Processes 224 and workflows 228, in one example, operate upon data entities 222 as well as other records 230 in order to enable the user to perform his or her operations within system 200. In one example, user interface component 216, either by itself or under the control of other items in system 200, generates user interface displays 118.

System 200 includes or is coupled to RDBMS structure component 219 in accordance with one embodiment. Structure component 219 may store a formalized definition of table structure and relationships of RDBMS 218. Such formalized definition may be created manually from a metadata store of system 200 or it may be created automatically. Embodiments where the structure component 219 creates a structural definition automatically are described in greater detail below.

Figure 2:
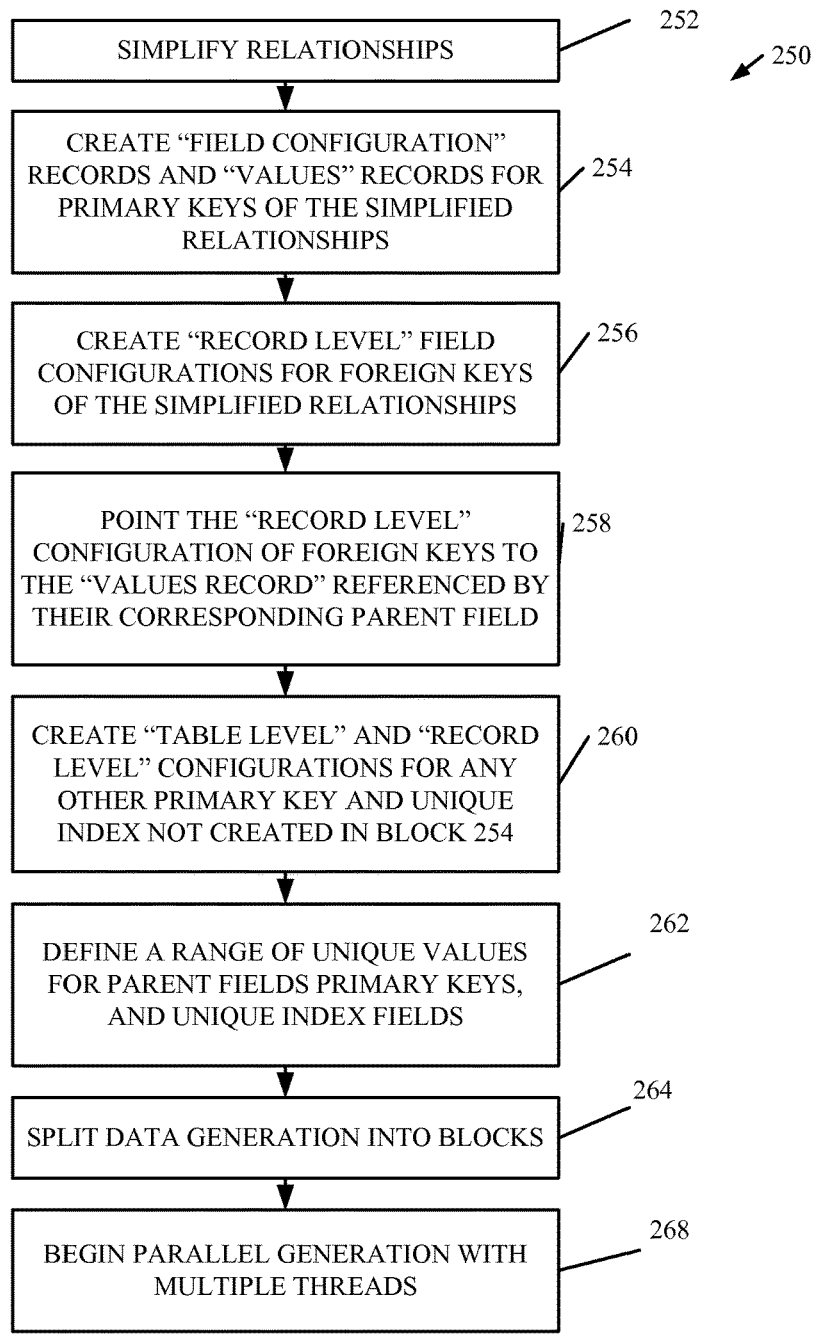
FIG. 2 is a flow diagram of a method of generating a large volume of customized synthetic data while maintaining relational integrity in accordance with an embodiment.

FIG. 2 is a flow diagram of a method of generating a large volume of customized synthetic data while maintaining relational integrity in accordance with an embodiment. Method 250 takes a number of inputs relative to relational database 218. In one embodiment, the inputs include:

The list of tables that represent the operation.
    Table element: {table name}
The list of enumerated records for each table that represent the operation.
    Record element: {table name, record identifier, record number}
A map with the relationships between each record, including the name of the fields involved in the relationship.
    Relationship element: {table name, field name, record identifier, referenced table name, referenced field name, referenced record identifier}

Unique indexes and primary keys metadata.
    Unique index element: {table name, list of fields}
    Primary key element: {table name, list of fields}
A list with all the fields' meta-data for each table.
    Field meta-data element: {table name, field name, data type}

One example of a relational database that is input to the method is set forth below.

Operation: Sample Order with 2 Lines.

List of Tables:

| Table Name |
| --- |
| SampleTable |
| SampleLine |
| InventTransOrigin |
| InventTransOriginSampleLine |

List of Records:

| Table name | Record identifier | Record number |
| --- | --- | --- |
| SampleTable | S1 | 1 |
| SampleLine | L1 | 1 |
| SampleLine | L2 | 2 |
| InventTransOrigin | T1 | 1 |
| InventTransOrigin | T2 | 2 |
| InventTransOriginSampleLine | O1 | 1 |
| InventTransOriginSampleLine | O2 | 2 |

Relationships Map:

Consider that the data model has the following relationships:

Relation 1: SampleLine.SampleId→SampleTable.SampleId

Relation 2: InventTransOrigin.SampleId→SampleLine.SampleId

Relation 3: InventTransOriginSampleLine.SampleId→InventTransOrigin.SampleId

Relation 4: InventTransOriginSampleLine.TransId→InventTransOrigin.TransId

Relation 5: SampleLine.TransId→InventTransOriginSampleLine.TransId

The input would be a map of the records that match each relationship:

| Table name | Field name | Record identifier | Referenced table name | Referenced field name | Referenced record identifier |
| --- | --- | --- | --- | --- | --- |
| SampleLine | SampleId | L1 | SampleTable | SampleId | S1 |
| SampleLine | SampleId | L2 | SampleTable | SampleId | S1 |
| InventTransOrigin | SampleId | T1 | SampleLine | SampleId | L1 |
| InventTransOrigin | SampleId | T2 | SampleLine | SampleId | L2 |
| InventTransOriginSampleLine | SampleId | O1 | InventTransOrigin | SampleId | T1 |
| InventTransOriginSampleLine | SampleId | O2 | InventTransOrigin | SampleId | T2 |
| InventTransOriginSampleLine | TransId | O1 | InventTransOrigin | TransId | T1 |
| InventTransOriginSampleLine | TransId | O2 | InventTransOrigin | TransId | T2 |
| SampleLine | TransId | L1 | InventTransOriginSampleLine | TransId | O1 |
| SampleLine | TransId | L2 | InventTransOriginSampleLine | TransId | O2 |

Unique Indexes and Primary Keys:

| Unique index name or Primary key name | Table Name | Field(s) |
|---|---|---|
| PK1 | SampleTable | SampleId |
| UIdx1 | SampleTable | RecId |
| PK2 | SampleLine | SampleId, LineNum |
| UIdx2 | SampleLine | RecId |
| PK3 | InventTransOrigin | TransId |
| UIdx3 | InventTransOrigin | RecId |
| PK4 | InventTransOriginSampleLine | TransId |
| UIdx4 | InventTransOriginSampleLine | RecId |

Fields Meta-Data:

| Table name | Field name | Data type |
|---|---|---|
| SampleTable | RecId | Int64 |
| SampleTable | SampleId | String |
| SampleTable | AccountNumber | String |
| SampleTable | OrderDate | Date |
| SampleLine | RecId | Int64 |
| SampleLine | SampleId | String |
| SampleLine | TransId | String |
| SampleLine | LineNum | real |
| SampleLine | ItemId | String |
| SampleLine | Quantity | Integer |
| InventTransOrigin | RecId | Int64 |
| InventTransOrigin | TransId | String |
| InventTransOrigin | CategoryReference | Int64 |
| InventTransOrigin | SampleId | String |
| InventTransOriginSampleLine | TransId | String |
| InventTransOriginSampleLine | SampleId | String |
| InventTransOriginSampleLine | CompanyId | String |

Method 250 begins at block 252 where the relationship map is simplified into a two-level relationships model where all foreign key fields are pointing to the parent field of the relationship hierarchy. An exemplary simplification is set forth below.

For example:

| Original group of relationships | Simplified two-level representation |
|---|---|
| A -> B | A -> D |
| B -> C | B -> D |
| C -> D | C -> D |
| | D: is the parent of the hierarchy. |
| A -> B | A -> E |
| C -> D | B -> E |
| D -> E | C -> E |
| B -> E | D -> E |
| | E: is the parent of the hierarchy. |

Relationships that are already in a two level representation and that cannot be simplified more remain the same.

| Original group of relationships | Simplified two-level representation |
|---|---|
| A -> B | A -> B |
| C -> D | C -> D |
| | B and D are parents of their own hierarchy. |

Circular references are avoided by tracking the visited relationships and an arbitrary foreign key is chosen as the parent of the relationship hierarchy:

| Original group of relationships | Simplified two-level representation |
|---|---|
| A -> B | In this case there are 3 possible representations and all of them are valid: |
| B -> C | |
| C -> A | $1^{st}$ possible representation: |
| | A -> B |
| | C -> B |
| | B: the parent of the hierarchy. |
| | $2^{nd}$ possible representation: |
| | B -> A |
| | C -> A |
| | A: the parent of the hierarchy. |
| | $3^{rd}$ possible representation: |
| | A -> C |
| | B -> C |
| | B: the parent of the hierarchy. |
| A -> B | In this case there are 2 possible representations and both of them are valid: |
| B -> A | |
| | $1^{st}$ possible representation: |
| | A -> B |
| | B: the parent of the hierarchy. |
| | $2^{nd}$ possible representation: |
| | B -> A |
| | A: the parent of the hierarchy. |

Self-relationships are excluded from the two-level representation, for example:

| Original group of relationships | Simplified two-level representation |
|---|---|
| A -> B | A -> B |
| B -> B | B: is the parent of the hierarchy. |

Repeated relationships are added to the two-level representation only one time, including simplified relationships:

| Original group of relationships | Simplified two-level representation |
|---|---|
| A -> B | A -> C |
| B -> C | B -> C |
| B -> C | C: the parent of the hierarchy. |
| A -> B | A -> C |
| B -> C | B -> C |
| A -> D | D -> C |
| D -> C | C: the parent of the hierarchy. |
| | Note that A has two relationships and both of them result in C as the parent of the hierarchy: |
| | A -> B -> C simplified as A -> C |
| | A -> D -> C simplified as A -> C |
| | Only one simplified relationship A -> C is included. |

If a group of relationships has two or more possible parents of the hierarchy, then the hierarchy is split into the multiple hierarchies, one for every possible parent. For example:

| Original group of relationships | Simplified two-level representation |
|---|---|
| A -> B | A -> C |
| B -> C | B -> C |
| A -> D | A -> E |
| D -> E | D -> E |
| B -> F | B -> F |
| | C, E, and F are the three parents of the three hierarchies. |

Examples

The map of relationships will be simplified as follows.
Original Map:

| Table name | Field name | Record id | Referenced Table name | Referenced Field name | Referenced Record id |
|---|---|---|---|---|---|
| SampleLine | SampleId | L1 | SampleTable | SampleId | S1 |
| SampleLine | SampleId | L2 | SampleTable | SampleId | S1 |
| InventTransOrigin | SampleId | T1 | SampleLine | SampleId | L1 |
| InventTransOrigin | SampleId | T2 | SampleLine | SampleId | L2 |
| InventTransOriginSampleLine | SampleId | O1 | InventTransOrigin | SampleId | T1 |
| InventTransOriginSampleLine | SampleId | O2 | InventTransOrigin | SampleId | T2 |
| InventTransOriginSampleLine | TransId | O1 | InventTransOrigin | TransId | T1 |
| InventTransOriginSampleLine | TransId | O2 | InventTransOrigin | TransId | T2 |
| SampleLine | TransId | L1 | InventTransOriginSampleLine | TransId | O1 |
| SampleLine | TransId | L2 | InventTransOriginSampleLine | TransId | O2 |

Simplified Map:

| Table name | Field name | Record identifier | Referenced table name | Referenced field name | Referenced record identifier |
|---|---|---|---|---|---|
| SampleLine | SampleId | L1 | SampleTable | SampleId | S1 |
| SampleLine | SampleId | L2 | SampleTable | SampleId | S1 |
| InventTransOrigin | SampleId | T1 | SampleTable | SampleId | S1 |
| InventTransOrigin | SampleId | T2 | SampleTable | SampleId | S1 |
| InventTransOriginSampleLine | SampleId | O1 | SampleTable | SampleId | S1 |
| InventTransOriginSampleLine | SampleId | O2 | SampleTable | SampleId | S1 |
| InventTransOriginSampleLine | TransId | O1 | InventTransOrigin | TransId | T1 |
| InventTransOriginSampleLine | TransId | O2 | InventTransOrigin | TransId | T2 |
| SampleLine | TransId | L1 | InventTransOrigin | TransId | T1 |
| SampleLine | TransId | L2 | InventTransOrigin | TransId | T2 |

At block 254, method 250 creates "field configuration" records as well as "values" records for each parent field in the hierarchies of the two-level relationships model. One example of such record creation is set forth below.
Format:
Field Configuration: {Table name, Field name, Record identifier, Values identifier}
Values record: {Values Identifier, String Prefix, Min value, Max value, Increment}
  a. First create a "table level" field configuration for each parent field. These configuration are called "table level" because they do not have a reference to the record identifiers of the tables.

For the example operation, the parent fields of the hierarchies are:

| Table name | Field name |
|---|---|
| SampleTable | SampleId |
| InventTransOrigin | TransId |

The "table level" field configurations would be:

| Table name | Field name | Record identifier | Values Identifier |
|---|---|---|---|
| SampleTable | SampleId | NULL | NULL |
| InventTransOrigin | TransId | NULL | NULL | b. Create a "values" record for each "table level" field configuration of the parent fields and add the reference to these "values" record in their corresponding "table level" field configuration.

For the example, there would be two new "values" records:

| Values Identifier | String prefix | Min value | Max value | Increment |
|---|---|---|---|---|
| V1 | NULL | NULL | NULL | NULL |
| V2 | NULL | NULL | NULL | NULL |

And the "table level" field configurations of the parent fields would be updated with a reference to them:

| Table name | Field name | Record identifier | Values Identifier |
|---|---|---|---|
| SampleTable | SampleId | NULL | V1 |
| InventTransOrigin | TransId | NULL | V2 | c. Create a "record level" field configuration for each parent fields and each record identifier of the corresponding table.
For example:
In the current example, three new "record level" field configurations will be created.
One for the record of the SampleTable and two for the records of the InventTransOrigin table:

| Table name | Field name | Record identifier | Values Identifier |
|---|---|---|---|
| SampleTable | SampleId | NULL | V1 |
| InventTransOrigin | TransId | NULL | V2 |
| SampleTable | SampleId | S1 | NULL |
| InventTransOrigin | TransId | T1 | NULL |
| InventTransOrigin | TransId | T2 | NULL | d. Point the "record level" field configuration to the same "values record" that is referenced by the "table level" configuration of the parent fields. For the current example, the "record level" field configuration will be updated with a reference to the values record referenced by their corresponding "table level" configuration:

| Table name | Field name | Record identifier | Values Identifier |
|---|---|---|---|
| SampleTable | SampleId | NULL | V1 |
| InventTransOrigin | TransId | NULL | V2 |
| SampleTable | SampleId | S1 | V1 |
| InventTransOrigin | TransId | T1 | V2 |
| InventTransOrigin | TransId | T2 | V2 |

At block 256, method 250 creates a "record level" field configuration for each foreign key in the simplified two-level relationship model. One example of such record creation is set forth below. For the current example, these would be the "record level" configurations for the foreign keys:

| Table name | Field name | Record identifier | Values Identifier |
|---|---|---|---|
| SampleLine | SampleId | L1 | NULL |
| SampleLine | SampleId | L2 | NULL |
| InventTransOrigin | SampleId | T1 | NULL |
| InventTransOrigin | SampleId | T2 | NULL |
| InventTransOriginSampleLine | SampleId | O1 | NULL |
| InventTransOriginSampleLine | SampleId | O2 | NULL |
| InventTransOriginSampleLine | TransId | O1 | NULL |
| InventTransOriginSampleLine | TransId | O2 | NULL |
| SampleLine | TransId | L1 | NULL |
| SampleLine | TransId | L2 | NULL |

Next, at block 258, the "record level" field configurations of foreign keys are pointed to the "values record" referenced by their corresponding parent field. An example is set forth below.

| Table name | Field name | Record identifier | Values Identifier |
|---|---|---|---|
| SampleTable | SampleId | NULL | V1 |
| InventTransOrigin | TransId | NULL | V2 |
| SampleTable | SampleId | S1 | V1 |
| InventTransOrigin | TransId | T1 | V2 |
| InventTransOrigin | TransId | T2 | V2 |
| SampleLine | SampleId | L1 | V1 |
| SampleLine | SampleId | L2 | V1 |
| InventTransOrigin | SampleId | T1 | V1 |
| InventTransOrigin | SampleId | T2 | V1 |
| InventTransOriginSampleLine | SampleId | O1 | V1 |
| InventTransOriginSampleLine | SampleId | O2 | V1 |
| InventTransOriginSampleLine | TransId | O1 | V2 |
| InventTransOriginSampleLine | TransId | O2 | V2 |
| SampleLine | TransId | L1 | V2 |
| SampleLine | TransId | L2 | V2 |

This mapping between field configuration and values records is what facilitates the generation of synthetic data with relational integrity.

Next, at block 260, "table level" and "record level" configurations for each unique index and primary key that was not included as part of the parent fields is created. An example is set forth below. In the example, "values" records are created for each of these fields and pointed to their "table level" and "record level" configurations to the corresponding "values record".

For example, these would be the new "values records":

| Values Identifier | String prefix | Min value | Max value | Increment |
|---|---|---|---|---|
| V3 | NULL | NULL | NULL | NULL |
| V4 | NULL | NULL | NULL | NULL |
| V5 | NULL | NULL | NULL | NULL |
| V6 | NULL | NULL | NULL | NULL |

These would be the field configurations for the other unique indexes and primary key fields that were not included as parent fields:

| Table name | Field name | Record identifier | Values Identifier |
|---|---|---|---|
| SampleTable | RecId | NULL | V3 |
| SampleTable | RecId | S1 | V3 |
| SampleLine | RecId | NULL | V4 |
| SampleLine | RecId | L1 | V4 |
| SampleLine | RecId | L2 | V4 |
| InventTransOrigin | RecId | NULL | V5 |
| InventTransOrigin | RecId | T1 | V5 |
| InventTransOrigin | RecId | T2 | V5 |
| InventTransOriginSampleLine | RecId | NULL | V6 |
| InventTransOriginSampleLine | RecId | O1 | V6 |
| InventTransOriginSampleLine | RecId | O2 | V6 |

At block 262, a range of unique values for the parent fields, primary keys and unique index fields is defined. In one example, the number of copies is used to generate the number of records included on each table to calculate the number of elements for each range:

Number of elements in the range=(number of record identifiers in the table)×(copies to generate)× (Increment)

The ranges are saved in the "values" records referenced by these fields. The range of unique values should avoid conflicts with existing data. Fields that have string data can be created with a prefix. The increment value for the ranges should be greater than 0. The default increment value that is used, in one example, is 1. Each field could have a different increment value. For example, to generate 10,000 copies of an order operation with 2 lines a range will be defined for the following parent fields, unique indexes and primary key fields:

| Table name | Field name | Data type | Number of records in table | Values Identifier | Number of elements in the range |
|---|---|---|---|---|---|
| SampleTable | SampleId | String | 1 | V1 | 10,000 |
| InventTransOrigin | TransId | String | 2 | V2 | 20,000 |
| SampleTable | RecId | Int64 | 1 | V3 | 10,000 |
| SampleLine | RecId | Int64 | 2 | V4 | 20,000 |
| InventTransOrigin | RecId | Int64 | 2 | V5 | 20,000 |
| InventTransOriginSampleLine | RecId | Int64 | 2 | V6 | 20,000 |

The ranges for these fields could be:

| Values Identifier | String prefix | Min value | Max value | Increment |
|---|---|---|---|---|
| V1 | S | 10,001 | 20,000 | 1 |
| V2 | T | 70,001 | 90,000 | 1 |
| V3 | NULL | 300,001 | 310,000 | 1 |
| V4 | NULL | 400,001 | 420,000 | 1 |
| V5 | NULL | 500,001 | 520,000 | 1 |
| V6 | NULL | 600,001 | 620,000 | 1 |

At block 264, a "commit size" is defined that will be used to split the data generation into blocks of equal size. In one example, to generate 10,000 copies with a commit size of 500 means that the data will be generated in 20 blocks of 500 copies each. Thus, Number of blocks=(Copies to generate/ Commit size). Additionally, the number of the first and last copy to generate is specified for each block. For example for blocks with a size of 500:

| Block number | Number of the first copy to generate | Number of the last copy to generate | Number of copies to generate |
|---|---|---|---|
| 1 | 1 | 500 | 500 |
| 2 | 501 | 1,000 | 500 |
| ... | ... | ... | ... |
| 20 | 9,501 | 10,000 | 500 |

At block 268, the parallel generation of synthetic data is started. A more detailed explanation of such data generation is described with respect to FIG. 3. However, in one example, each thread will execute code similar to the following pseudo code:

```
Generate data (List of records)
{
    while there are blocks not generated
    {
        block = get next block not generated
        Generate block of data (List of records, block)
    }
}
```

Figure 3:
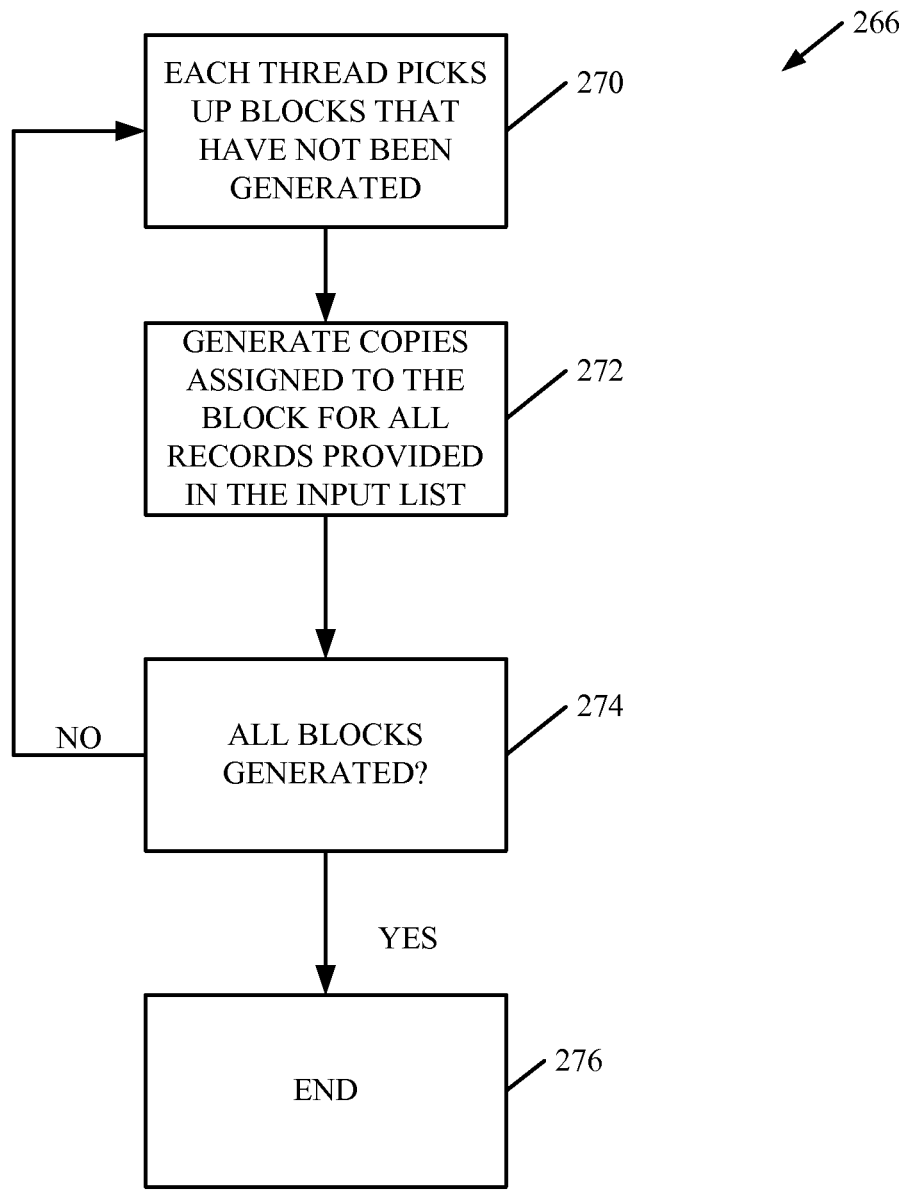
FIG. 3 is a flow diagram of block processing in accordance with an embodiment.

FIG. 3 is a flow diagram of block processing in accordance with an embodiment. The block processing illustrated in FIG. 3 occurs within block 268 shown in FIG. 2. At block 270, each thread will pick up blocks in the list that have not been generated. Next, at block 272, each thread will generate copies assigned to that block for all records provided in the input list. Finally, at block 274, each thread will determine whether all blocks have been generated. If so, control passes to block 276 and generation is complete. If not, control returns to block 270 and data generation will continue until all blocks have been processed.

Figure 4:
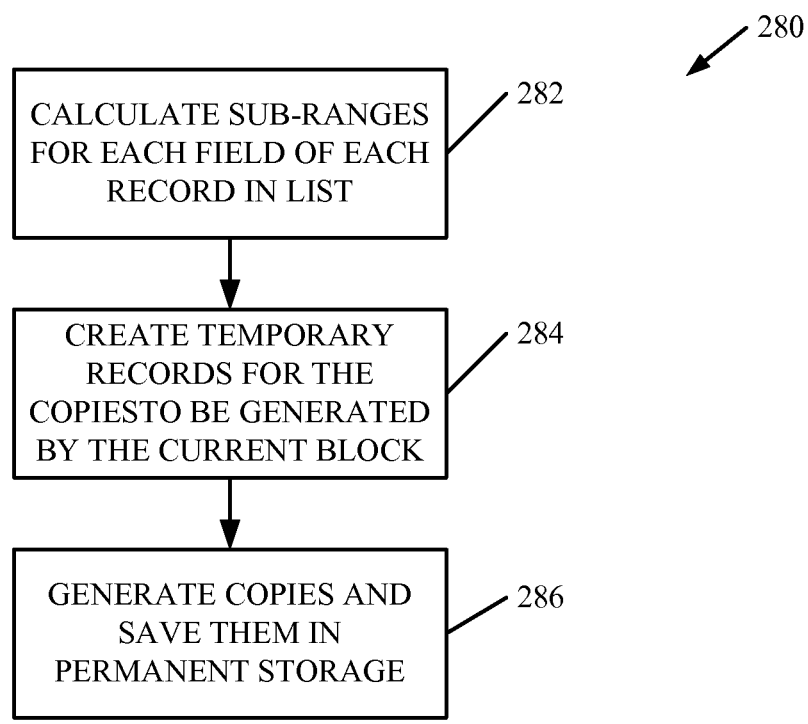
FIG. 4 is a flow diagram of block generation in accordance with an embodiment.

FIG. 4 is a flow diagram of block generation in accordance with an embodiment. Method 280 begins at block 282 where the sub-ranges for each field of each record in the list are calculated. Examples of sub-range calculation are set forth below.
1. Loop over each record in the list and then do a loop over each "record level" field configurations defined for each record.
2. Calculate the sub-range of values to be used for each of these fields.
3. To calculate the sub-ranges, get the original range from the "values" record that is referenced in the field configuration.
    a. Use the following operations to calculate the sub-range:

Range=[Max Value,Min Value]

Number of elements=(Max Value−Min Value+1)/ Increment

First element=(Parent Record Number−1)*total number of copies $A$=Min Value+Increment*(First element % Number of elements)

$B$=$A$+increment*total number of copies−1

Sub-range=[$A$,$B$]

b. To Identify the Parent record number used in the formula follow these steps:
        i. If the field is a parent field, a primary key or a unique index, then the Parent record number is equal to the record number of the current record.
        ii. If the field is a foreign key, then the parent record number is the record number of the parent field that is referenced by the foreign key.
            1. Use the map of simplified relationships and the list of record identifiers to get the parent record number.
    The calculated sub-ranges contains all the values to be used for each field. Note: the "total number of copies" is the number of copies to be created during the complete data generation. The increment of the range is copied to the sub-ranges.
4. Save the sub-range in a temporary map with the record identifier of the current record and the current field name:

Map-sub-ranges [record identifier, field name]=sub-range.

Pseudo code to calculate the sub-ranges:

```
Calculate sub-ranges (list of records)
{
    for each record in the list
    {
        for each record level field configuration
        {
            Calculate field sub-range (record, field configuration)
        }
    }
}
Calculate field sub-range (record, field configuration)
{
    values = get the values record (field configuration)
    Record number = Get record number (record, field)
    Range = [values.MinValue, values.MaxValue]
    Increment = Range.Increment
    Number of elements = (Range.MaxValue − Range.MinValue + 1) / Increment
    First element = (Record Number −1) * total number of copies
    A = Range.MinValue + Increment * (First element % Number of elements)
    B = A + increment * total number of copies − 1
    Sub-range = [A, B]
    Sub-range.Increment = increment
    Map-sub-ranges [record identifier, field name] = sub-range
}
Get record number (record, field)
{
    if (field is parent field, primary key or unique index)
    {
        Record number = record.Number
    }
    else
    {
        // the field is a foreign key
        Parent record = get parent record from the simplified map relationship
        Record number = Parent record number
    }
    return Record number
}
```

Examples of Sub-Range Calculations:

Assuming the total number of copies is 10,000 and the commit size or "block size" is 500.

1. Calculations of the sub-ranges for the RecId field of the SampleLine records:

Record Level Configurations:

| Table name | Field name | Record identifier | Values Identifier |
|---|---|---|---|
| SampleLine | RecId | L1 | V4 |
| SampleLine | RecId | L2 | V4 |

Values Record:

| Values Identifier | String prefix | Min value | Max value | Increment |
|---|---|---|---|---|
| V4 | NULL | 400,001 | 420,000 | 1 |

Sub-Ranges for Each Record:

| Sub-range number | Record identifier | Field name | Min value | Max value | Increment |
|---|---|---|---|---|---|
| 1 | L1 | RecId | 400,001 | 410,000 | 1 |
| 2 | L2 | RecId | 410,001 | 420,000 | 1 |

Calculation for Sub-Range 1:

Number of elements=(Range.MaxValue−Range.MinValue+1)/Increment

Number of elements=(420,000−400,001+1)/1

Number of elements=20,000

First element=(Record Number−1)*total number of copies

First element=(1−1)*10,000

First element=0

$A$=Range.MinValue+Increment*(First element % Number of elements)

$A$=400,001+1*(0% 20,000)

$A$=400,001

$B$=$A$+increment*total number of copies−1

$B$=400,001+1*10,000−1

$B$=410,000

Sub-range=[$A$,$B$]

Sub-range=[400,001;410,000]

Calculation for Sub-Range 2:

Number of elements=(Range.MaxValue−Range.MinValue+1)/Increment

Number of elements=(420,000−400,001+1)/1

Number of elements=20,000

First element=(Record Number−1)*total number of copies

First element=(2−1)*10,000

First element=10,000

$A$=Range.MinValue+Increment*(First element % Number of elements)

$A$=400,001+1*(10,000% 20,000)

$A$=410,001

$B$=$A$+increment*total number of copies−1

$B$=410,001+1*10,000−1

$B$=420,000

Sub-range=[$A$,$B$]

Sub-range=[410,001;420,000]

Calculations of the sub-ranges of the SampleId field of the SampleTable record:

Record Level Configurations:

| Table name | Field name | Record identifier | Values Identifier |
|---|---|---|---|
| SampleTable | SampleId | S1 | V1 |

Values Record:

| Values Identifier | String prefix | Min value | Max value | Increment |
|---|---|---|---|---|
| V1 | S | 10,001 | 20,000 | 1 |

Sub-Ranges for Each Record(s):

| Sub-range number | Record identifier | Field name | String Prefix | Min value | Max value | Increment |
|---|---|---|---|---|---|---|
| 1 | S1 | SampleId | S | 10,001 | 20,000 | 1 |

Calculation for Sub-Range 1:

Number of elements=(Range.MaxValue−Range.MinValue+1)/Increment

Number of elements=(20,000−10,001+1)/1

Number of elements=10,000

First element=(Record Number−1)*total number of copies

First element=(1−1)*10,000

First element=0

$A$=Range.MinValue+Increment*(First element % Number of elements)

$A$=10,001+1*(0% 10,000)

$A$=10,001

$B$=$A$+increment*total number of copies−1

$B$=10,001+1*10,000−1

$B$=20,000

Sub-range=[$A$,$B$]

Sub-range=[10,001;20,000]

Sub-range=[$S10001$,$S20000$]

All the foreign keys that have the SampleId on the SampleTable as their parent field will have the same calculated sub-range for all of their records. That happens because the same "Record Number" of the parent field is used in the calculation.

At block 284, the thread creates temporary records for the copies to be generated by the current block. In one example, this is as follows.

1. Loop through each record in the list and then do a loop to generate the temporary records. Generate one temporary record for each copy to be generated by the current block.

For example, if the current block has 10 records in the list and it needs to generate 500 copies of each record, then the thread will generate a total of 5000 temporary records, 500 for each record.

2. To generate each temporary record, loop through every "record level" field configuration of the record to copy.

It is important to note that these temporary records will only have values for the fields that have "record level" field configurations. For example, if a record has five fields and only two of them have "record level" field configurations, then the temporary records associated to this record will only have two fields.

Example of a temporary record definition:
   Original Record {Field1, Field2, Field3, Field4, Field5}
   Fields with record level configuration: Field1 and Field3.
   Temporary Record {Field1, Field3}

3. For each of these fields, calculate the value to use within the sub-range that was defined for the current record and the current field.

a. Use the number of the current copy to calculate the value to use:

sub-range=[$A$,$B$]

value=$A$+(copy number−1)*increment

4. Save the temporary records in a temporary location with one transaction.

Pseudo Code:

```
Create new values (list of records, block number)
{
    [first copy number, last copy number] = Get copy numbers(block number)
    begin transaction
    for each record in the list
    {
        copy number = first copy number
        while (copy number<last copy number)
        {
            tempRecord=Create temporary record(record, copy number)
            Save in temporary location (tempRecord, block number)
        }
    }
    commit transaction
}
Create temporary record (record, copy number)
{
    tempRecord = new temporary record
    for each record level field configurations
    {
        value = Get next value ( record identifier, field configuration)
        tempRecord.FieldName = value
    }
    return tempRecord;
}
Get next value (record identifier, field name, copy number)
{
    sub-range = Map-sub-ranges [record identifier, field name]
    A = sub-range.MinValue
    Increment = sub-range.Increment
    value = A + (copy number −1) * increment
    return value
}
```

At block 286, the thread generates the copies of the records assigned to the block by merging the new values in the temporary location with the original records. These new copies are saved in the permanent storage. In one example, the operation is performed as follows.

1. Loop through each record in the list and for each record get the list of temporary records associated to it.
2. Loop through each temporary record and create a new copy of the original record by merging the values from the temporary record with the values of the original record.
   a. Get the list of fields with "record level" field configurations and the list of fields without "record level" field configurations.
   b. Get the values of the fields with "record level" configurations from the current temporary record and copy these values to the new copy record.
   c. Get the values of the fields without "record level" configurations from the current original record and copy these values to the new copy record.
3. Save all copies of all records in a single transaction.

It is useful to note that saving all the generated copies of the block in a single transaction allows embodiments to guarantee that each operation that has been synthetically generated is complete. The following is an example of Pseudo Code that implements the save operation.

```
Save copies in permanent storage (list of records, block number)
{
    Begin transaction
    for each original record in the list of records
    {
        list of temporary records = Get temporary records (record, block number)
        for each temporary record in the list of temporary records
        {
            copy record = new record
            fields with configurations =
            Get fields with configurations(original record)
            fields with no configurations =
            Get fields with no configurations(original record)
            source=temporary record
            destination= copy record
            fields = fields with configurations
            copy values(source, destination, fields)
            source=original record
            destination=copy record
            fields = fields with no configurations
            copy values(source, destination, fields)
            save in permanent storage (copy record)
        }
    }
    Commit transaction
}
```

Embodiments described thus far have generally utilized a formalized definition of the table structure from a metadata store of the computer system itself to ensure that the integrity of RDBMS 218 is maintained as vast amounts of synthetic data are generated. However, in some embodiments, a formal definition of the structure of RDBMS 218 may not be available. Some systems can be very complex and even with a deep knowledge of the system internals it may be difficult to define which metadata must be included and which must be excluded in order to generate meaningful synthetic data without compromising functional and relational integrity. Thus, it may sometimes be useful to ascertain or otherwise automatically detect metadata of the system in order to create the synthetic data without knowing the system internals. In accordance with one embodiment, execution of a given operation is captured by tracing all the events that save data into the data storage. One way in which tracing can be accomplished is by using a system tracing component, such as the Event Tracing for Windows (ETW) framework, available in systems provided by Microsoft Corporation. Alternatively a snapshot of the data storage can be captured both before and after the execution of the given operation. In either approach, the names of the tables and the record identifiers on each event can be identified. If the snapshots were captured instead of the traced events, then such snapshots will be used to get the list of new record identifiers that were created for each table between the first and the second snapshot.

In one example, the list of tables and the list of record identifiers for each table is saved. Duplicates are then removed as well as record identifiers of non-existent records. Next, the relationships meta-data that reference tables that are included on the list of tables is selected. This subset of relationships meta-data is then saved in a list. Each relationship is looped through and the list of record identifier pairs that match the definition of each relationship is obtained. To get the list of matched records pairs, an intersection operation is done between the lists of record identifiers of the referenced tables with the constraints and operators defined in the relationship meta-data. An example using SQL is set forth below. In this example the relationship metadata is: TableA.Field1==TableB.Field1 && TableA.Field2==TableB.Field2 IdentifiersA and IdentifiersB are the list of record identifiers of TableA and TableB that were created and captured during the execution of the operation. These records were obtained in an earlier step.

IdentifiersA: is the list of record identifiers of TableA.
IdentifiersB: is the list of record identifiers of TableB.
The generated SQL query to do the intersection operation would be:
select
    TableA.RecId, TableB.RecId 'RefRecId'
from
    TableA, TableB, IdentifiersA, IdentifiersB
where
    TableA.RecId=IdentifiersA.RecId and
    IdentifiersB.RecId=TableB.RecId and
    TableA.Field1=TableB.Field1 and
    TableA.Field2=TableB.Field2

A map for each pair of record identifiers that matched the definition of the relationship with the name of the referenced tables and the name of the fields that were used in the constraints of the intersection operation is saved. For example, if the list of record identifiers pairs that match the definition of the relationship is this,

| TableA | TableB |
| --- | --- |
| RecId1 | RecId2 |
| RecId3 | RecId4 | then the map for each pair of record identifiers would be as follows.
Maps for the First Pair:
[TableA, Field1, RecId1, TableB, Field1, RecId2]
[TableA, Field2, RecId1, TableB, Field2, RecId2]
Maps for the Second Pair:
[TableA, Field1, RecId3, TableB, Field1, RecId4]
[TableA, Field2, RecId3, TableB, Field2, RecId4]
This list of maps can be used by embodiments described above to generate synthetic data.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each. It will be noted that fewer blocks can be used so the functionality is performed by fewer components. Also, more blocks can be used with the functionality distributed among more components.

Figure 5:
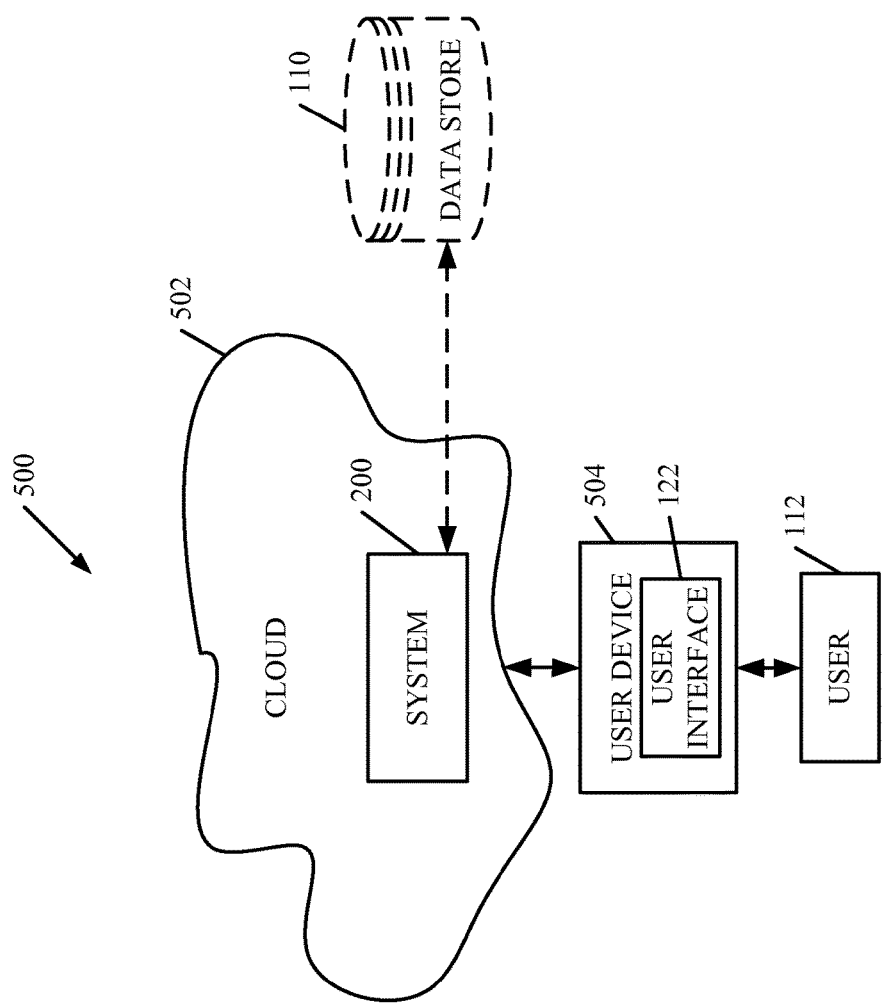
FIG. 5 is a block diagram of an architecture, shown in FIG. 1, except that at least some of its elements are disposed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that system 200 is located in cloud 502 (which can be public, private, or a combination where portions are public while others are private). Therefore, user 112 uses a user device 504 to access those systems through cloud 502.

FIG. 5 also depicts another embodiment of a cloud architecture. FIG. 5 shows that it is also contemplated that some elements of system 200 are disposed in cloud 502 while others are not. By way of example, data store 110 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
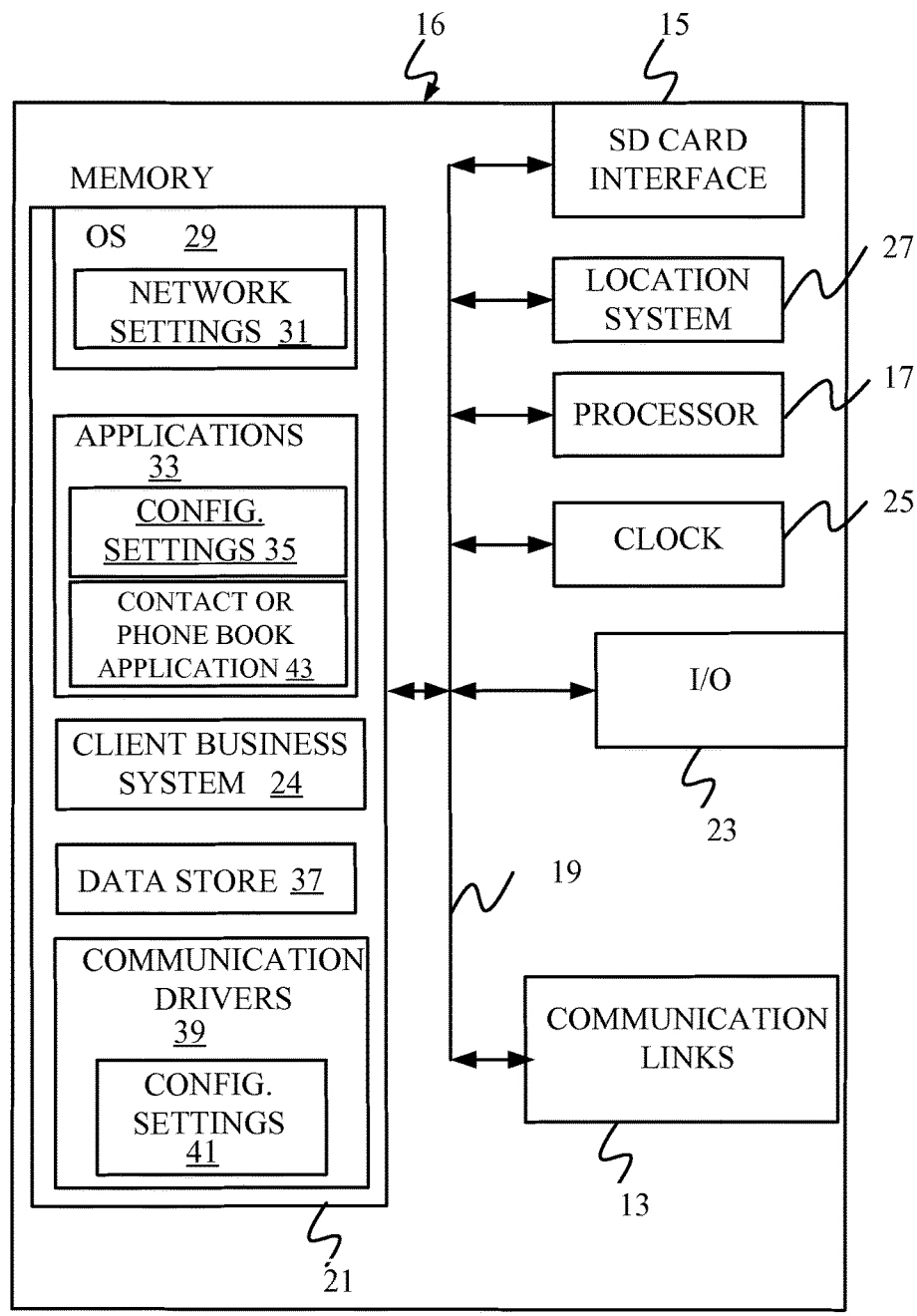
FIG. 6 is a simplified block diagram of one illustrative embodiment of a handheld or mobile computing device that can be used as a user's or client's hand held device, in which the present system (or parts of it) can be deployed.
Figure 7:
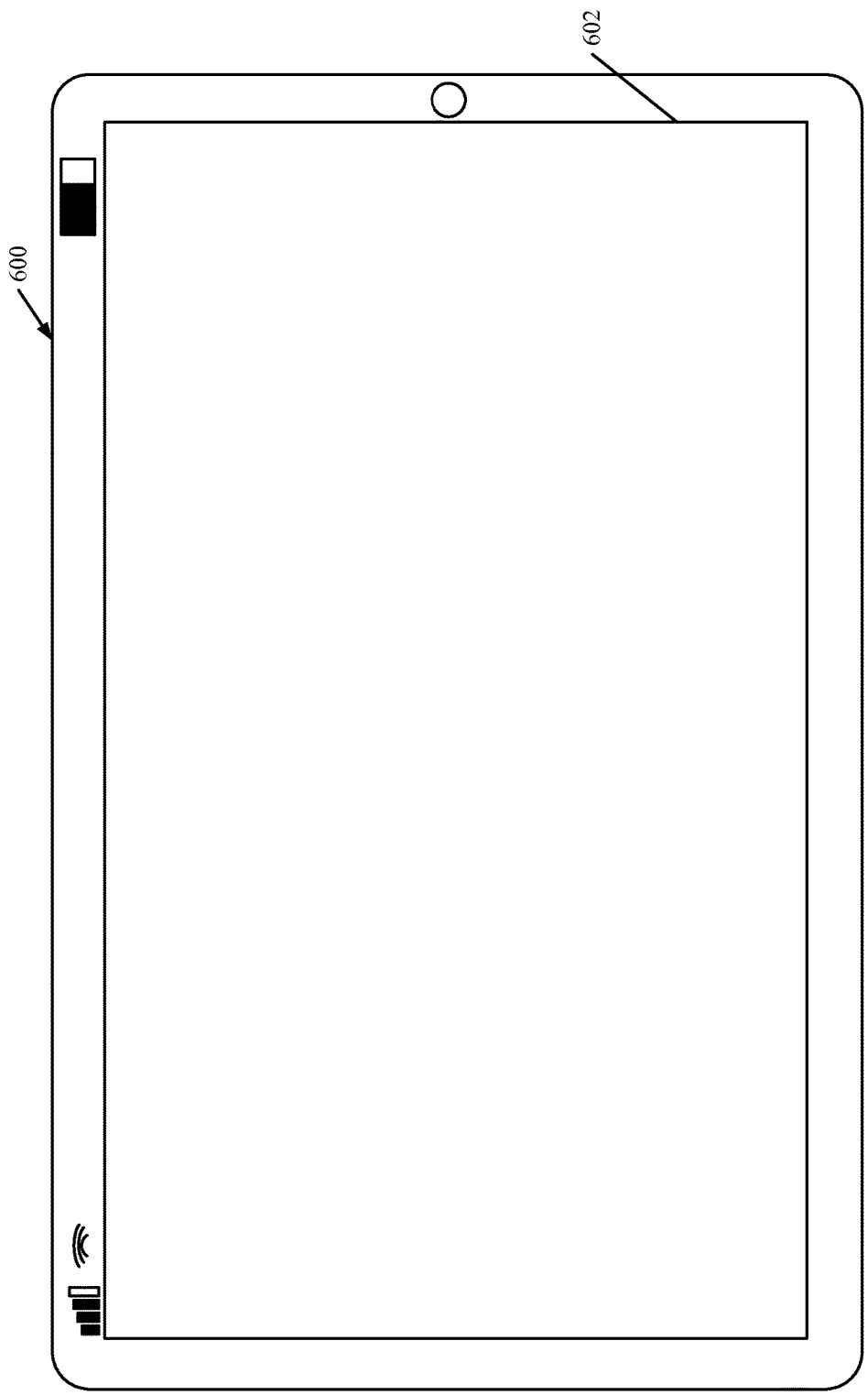
FIG. 7 is a diagrammatic view of a tablet computer that can be used as a user's mobile device.
Figure 8:
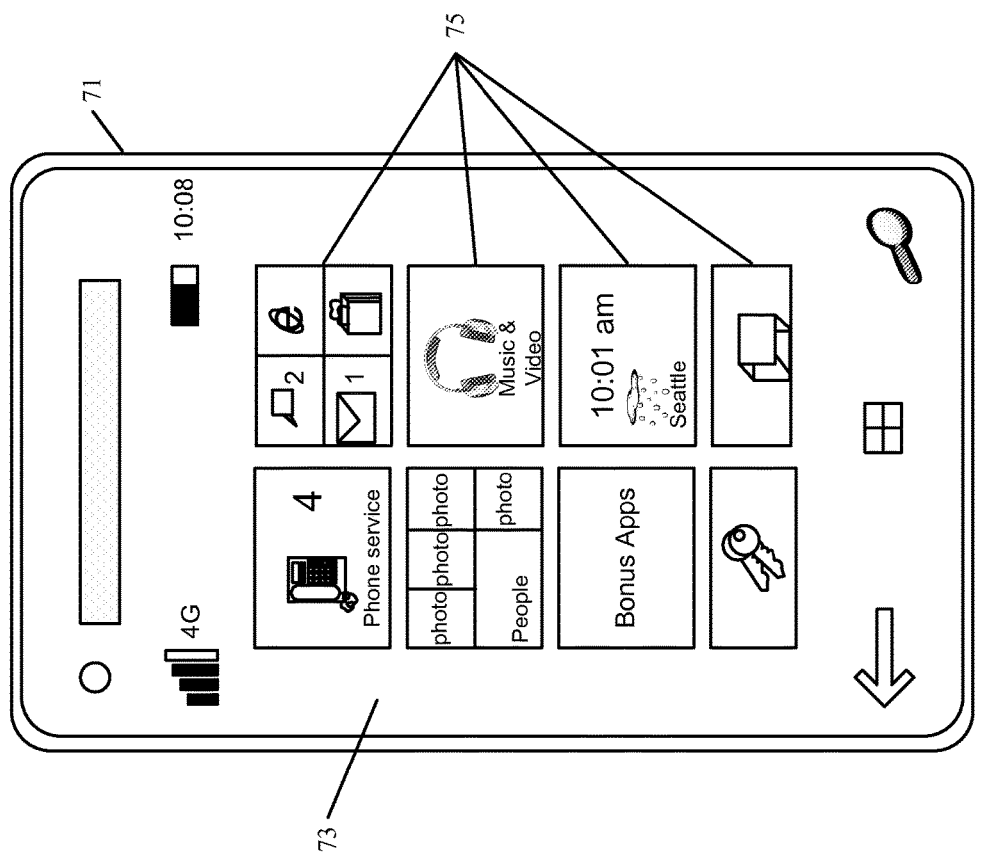
FIG. 8 is a diagrammatic view of smartphone that can be used as a user's mobile device.

FIG. 6 is a simplified block diagram of one illustrative embodiment of a handheld or mobile computing device that can be used as a user's or client's hand held device 16, in which the present system (or parts of it) can be deployed. FIGS. 7 and 8 are examples of handheld or mobile devices.

FIG. 6 provides a general block diagram of the components of a client device 16 that can run components of system 200 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Items in data store 212, for example, can reside in memory 21. Similarly, device 16 can have a client system 24 which can run various applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with a user interface displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 provides an additional example of devices 16 that can be used, although others can be used as well. In the example shown in FIG. 8, the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers advanced computing capabilities.

Note that other forms of the devices 16 are possible.

Figure 9:
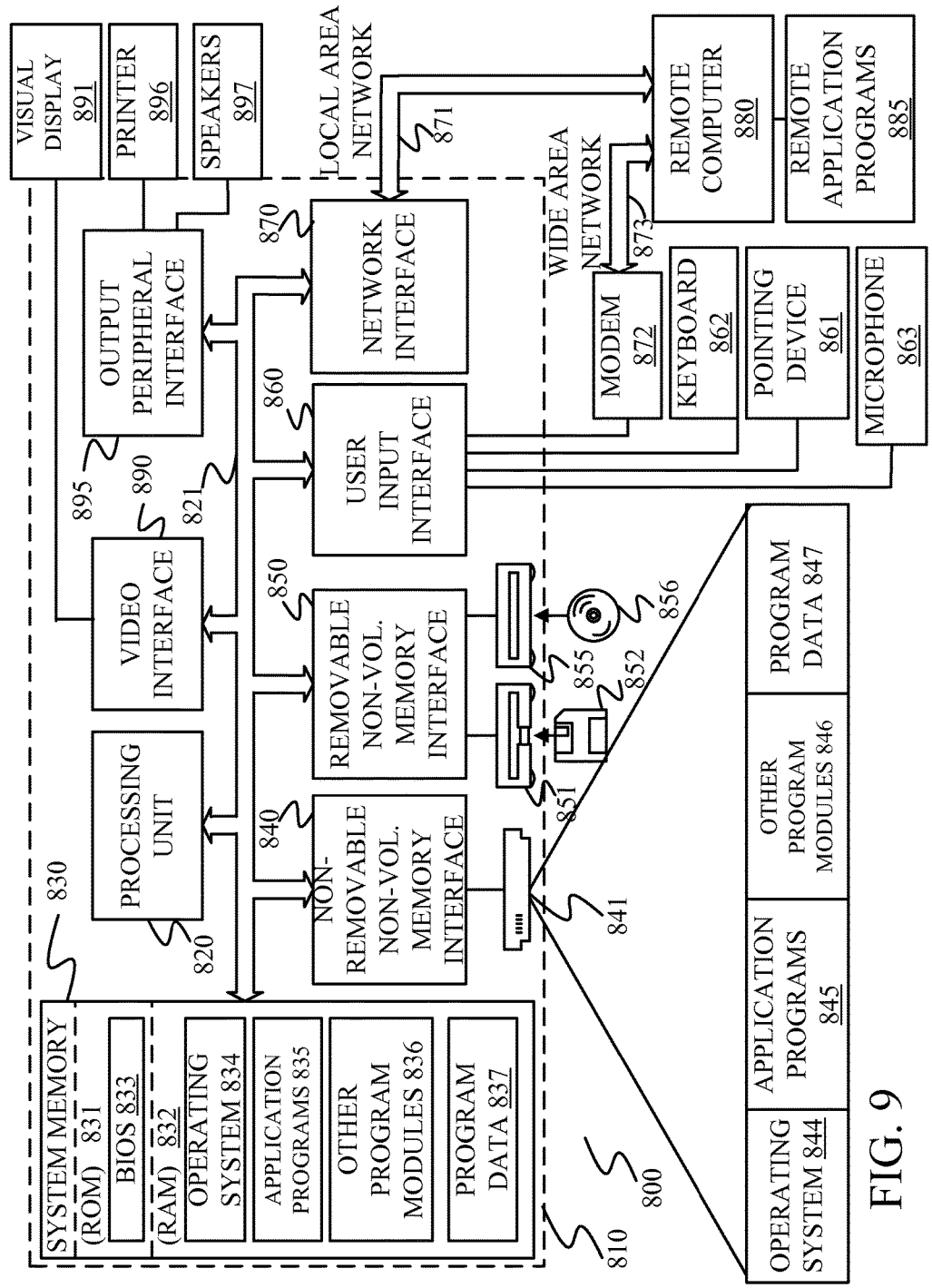
FIG. 9 is one embodiment of a computing environment in which architecture 100, or parts of it, (for example) can be deployed.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820.

The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

In the description above, the terms "Table" and "Field" can be replaced with appropriate terms for the data model and the storage implementation of the computer system. In the examples provided the disclosed lists and maps are saved in tables of a SQL database, but other formats and locations can be used as well.

Example 1 is a computing system for generating synthetic data in a relational database management system. The computing system includes a processor configured to execute a plurality of programmatic threads and a relational database structure component having information indicative of a structure of the relational database management system. The processor is configured to receive values information relative to the synthetic data and to execute, substantially simultaneously, a plurality of synthetic data generation threads using the information indicative of the structure of the relational database management system and the values information.

Example 2 is the computing system of any or all previous examples wherein the relational database structure component is configured to receive a formal definition of a structure of the relational database management system.

Example 3 is the computing system of any or all previous examples wherein the formal definition of the structure of the relational database management system includes a listing of tables, a listing of records associated with each table, and a map of relationships between each record.

Example 4 is the computing system of any or all previous examples wherein the relational database management system is a component of the computing system.

Example 5 is the computing system of any or all previous examples wherein the relational database structure component is configured to automatically determine structure of the relational database management system.

Example 6 is the computing system of any or all previous examples wherein the relational database structure component uses an event tracing component to capture and analyze events that save data into the relational database management system.

Example 7 is the computing system of any or all previous examples wherein the relational database structure component is configured to obtain snapshot information before and after a data storage operation and obtain a list of new record identifiers created between each table of the relational database management system from the data storage operation.

Example 8 is the computing system of any or all previous examples wherein the processor is configured to store a list of tables and a list of record identifiers for each table in a data store of the computing system.

Example 9 is the computing system of any or all previous examples wherein the processor is configured to simplify the information indicative of the structure of the relational database management system before executing the plurality of synthetic data generation threads.

Example 10 is the computing system of any or all previous examples wherein simplification includes simplifying a relationship map to a two-level relationship model.

Example 11 is a computer-implemented method of generating synthetic data for a relational database management system. The computer-implemented method includes obtaining information regarding tables of the relational database management system and relationships between records and fields in the table. The computer-implemented method also includes simplifying the relationships to create a simplified relationship map. Field configuration records and values records are defined based on the simplified relationship map. A range of values is determined for synthetic data generation. The data generation task is broken into a plurality of blocks, where each block includes a list of records to generate. The plurality of blocks are operated upon using a plurality of processing threads to generate synthetic data records in the relational database management system in parallel.

Example 12 is the computer-implemented method of any or all previous examples wherein obtaining information regarding tables of the relational database management system includes automatically determining structure of the relational database management system.

Example 13 is the computer-implemented method of any or all previous examples wherein simplifying the relationships includes simplifying information indicative of the structure of the relational database management system to two-level relationship model.

Example 14 is the computer-implemented method of any or all previous examples wherein simplifying the relationships includes excluding self-relationships from the two-level model.

Example 15 is the computer-implemented method of any or all previous examples wherein simplifying the relationships includes tracking visited relationships and assigning a foreign key as a parent of a relationship hierarchy.

Example 16 is the computer-implemented method of any or all previous examples wherein each field configuration record includes a table name, field name, record identifier, and values identifier.

Example 17 is the computer-implemented method of any or all previous examples wherein each values record includes, at least, a values identifier, a minimum value, a maximum value, and an increment.

Example 18 is the computer-implemented method of any or all previous examples wherein the synthetic data is selected to avoid conflict with existing data in the relational database management system.

Example 19 is the computer-implemented method of any or all previous examples wherein the method is implemented in a single transaction of the relational database management system.

Example 20 is the computer-implemented method of generating synthetic data in a relational database system. The computer-implemented method includes obtaining information indicative of a structure of the relational database management system. Parameters of the synthetic data are defined. A plurality of computing threads is engaged to generate the synthetic data in the relational database management system using the information indicative of the structure of the relational database management system and the parameters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for generating synthetic data in a relational database management system, the computing system comprising:
    a processor configured to execute a plurality of programmatic threads;
    a relational database structure component having information indicative of a structure of the relational database management system;
    the processor being configured to simplify the information indicative of the structure of the relational database management system to a simplified two-level relationship model by tracking visited relationships and assigning a foreign key as a parent of a relationship hierarchy, the processor being configured to receive values information relative to the synthetic data and to execute, substantially simultaneously, a plurality of synthetic data generation threads using the simplified two-level relationship models, the values information, and a mapping between field configuration records and the values information to provide relational integrity of the synthetic data.

2. The computing system of claim 1, wherein the relational database structure component is configured to receive a formal definition of the structure of the relational database management system.

3. The computing system of claim 2, wherein the formal definition of the structure of the relational database management system includes a listing of tables, a listing of records associated with each table, and a map of relationships between each record.

4. The computing system of claim 1, wherein the relational database management system is a component of the computing system.

5. The computing system of claim 4, wherein the relational database structure component is configured to automatically determine structure of the relational database management system.

6. The computing system of claim 5, wherein the relational database structure component uses an event tracing component to capture and analyze events that save data into the relational database management system.

7. The computing system of claim 5, wherein the relational database structure component is configured to obtain snapshot information before and after a data storage operation and obtain a list of new record identifiers created between each table of the relational database management system from the data storage operation.

8. The computing system of claim 5, wherein the processor is configured to store a list of tables and a list of record identifiers for each table in a data store of the computing system.

9. A computer-implemented method of generating synthetic data for a relational database management system, the method comprising:
    obtaining information regarding tables of the relational database management system and relationships between records and fields in the table;
    simplifying the relationships to create a simplified relationship map;
    defining field configuration records, each field configuration record including a table name, field name, record identifier, and values identifier, and defining values records based on the simplified relationship map wherein each values record includes, at least, a values identifier, a minimum value, a maximum value, and an increment;
providing a mapping between field configuration records and values records:
determining a range of values for synthetic data generation;
breaking a data generation task into a plurality of blocks, where each block includes a list of records to generate; and
operating on the plurality of blocks using a plurality of processing threads to generate synthetic data records in the relational database management system in parallel using the mapping to provide relational integrity of the synthetic data records.

10. The computer-implemented method of claim 9, wherein obtaining information regarding tables of the relational database management system includes automatically determining structure of the relational database management system.

11. The computer-implemented method of claim 9, wherein simplifying the relationships includes simplifying information indicative of the structure of the relational database management system to two-level relationship model.

12. The computer-implemented method of claim 11, wherein simplifying the relationships includes excluding self-relationships from the two-level model.

13. The computer-implemented method of claim 9, wherein simplifying the relationships includes tracking visited relationships and assigning a foreign key as a parent of a relationship hierarchy.

14. The computer-implemented method of claim 9, wherein the synthetic data is selected to avoid conflict with existing data in the relational database management system.

15. The computer-implemented method of claim 9, wherein the method is implemented in a single transaction of the relational database management system.

16. A computer-implemented method of generating synthetic data in a relational database system, the method comprising:
obtaining information indicative of a structure of the relational database management system;
simplifying, using a processor, the information indicative of the structure of the relational database management system to a two-level relationship model;
creating a plurality of field configuration records and values records for primary keys of the two-level relationship model;
creating record level field configurations for foreign keys of the two-level relationship model;
using the field configuration records, values records, and a mapping between the field configuration records and the values records to define a data generation operation that provides relational integrity of the synthetic data;
splitting the data generation operation into blocks; and
engaging a plurality of computing threads to each process a different block to generate the synthetic data in the relational database management system.

17. The computer-implemented method of claim 16, and furthering comprising setting record level configuration of the foreign keys values record referenced by a corresponding parent field.

18. The computer-implemented method of claim 17, and further comprising defining a range of unique values for parent field primary keys.

* * * * *